United States Patent [19]

Nakamura

[11] 4,149,418
[45] Apr. 17, 1979

[54] TURN RATE INDICATOR OF AIRCRAFT WITH IMPROVED ZERO SEEKING CHARACTERISTICS

[75] Inventor: Shuji Nakamura, Komae, Japan

[73] Assignee: Tokyo Aircraft Instrument Co., Ltd., Tokyo, Japan

[21] Appl. No.: 894,152

[22] Filed: Apr. 6, 1978

[30] Foreign Application Priority Data

Feb. 28, 1978 [JP] Japan ................................. 53-22543

[51] Int. Cl.² .......................... G01P 9/02; G01C 19/30
[52] U.S. Cl. ........................................ 73/504; 74/5.1; 74/5.42
[58] Field of Search ................... 73/504; 74/5.41, 5.42, 74/5.46, 5.1

[56] References Cited

U.S. PATENT DOCUMENTS

| | | | |
|---|---|---|---|
| 1,713,930 | 5/1929 | Sperry | 73/504 |
| 2,924,978 | 2/1960 | Barnes | 74/5 |

*Primary Examiner*—James J. Gill
*Attorney, Agent, or Firm*—Spencer & Kaye

[57] ABSTRACT

A turn rate indicator for an aircraft includes magnetic substance pieces facing each other, one being rotatable integrally with a gimbal and the other being fixed to a body. Because of the attracting force generated between the magnetic substance pieces, a pointer of the indicator returns to its zero point smoothly and certainly.

7 Claims, 5 Drawing Figures

TURN RATE INDICATOR OF AIRCRAFT WITH IMPROVED ZERO SEEKING CHARACTERISTICS

This invention relates to a turn rate indicator for mounting in an aircraft to turn rate of the aircraft. More particularly, it relates to a turn rate indicator whose zero seeking indication performance is improved.

Turn rate indicators such as turn-and-bank indicators, turn coordinators, etc, are known. In these indicators, gyroscopes are used wherein the rotation angle of a gimbal supporting a gyro rotor with respect to the aircraft body is indicated. The indication is made by a pointer in the form of, for example, turn rate of 90°/minute or 180°/minute.

In such an indicator, the gimbal which rotatably supports the gyro rotor is given a returning torque in the direction of a zero turn point by way of a hair spring or a tension spring, and the angular position of the gimbal is determined by the balance between the precession torque of the gyro generated by turning of the aircraft and the spring, which is indicated as a turn rate. The returning torque of the spring to the zero point is proportional to its angular displacement. Therefore the larger the rotation of the gimbal, the larger is the returning torque. When its displaced angle closes to zero, the returning torque decreases in proportion thereto.

In order to avoid resonance of the spring and the inertia around the gimbal shaft of the gimbal assembly which includes a motor rotor and a motor stator constituting the gyro rotor, a damping device is provided of the gimbal side, whose damping coefficient is 1 in the case of the usual turn rate indicators (so-called critical damping) and more than 1 in the case of the turn coordinators (over damping).

Returning time to the zero point after termination of turning is rather long and complete return to the zero point might not be expected because of the slight friction which is present. These facts give the pilot of the aircraft a sense of uneasiness.

It is therefore an object of the present invention to provide a turn rate indicator for an aircraft with improved zero seeking characteristics to the extent that the indication of the instruments is not substantially impaired.

In order to fulfil the above object, the turn rate indicator of the aircraft according to this invention comprises a gimbal supporting a gyro rotor and having freedom around one axis, which is given a returning torque to zero point and supported to a body, indication means which makes an indication in proportion to an angular displacement of the gimbal, a damping device in an angular direction of the gimbal, a magnetic substance piece which rotates integrally with the gimbal and supported apart from a gimbal shaft, and another magnetic substance piece fixed to the body, which is faced to the other magnetic substance piece beyond an air gap when the gimbal is in its zero point and is attracted from each other. Either of the magnetic substance pieces is a permanent magnet piece.

With the construction above mentioned, the zero seeking characteristics can be improved. Namely, when the pointer returns to the vicinity of the zero point, the magnetic substance pieces coact to return the pointer with certainty to the zero point. In this case, the magnetic force of the magnetic substance pieces do not adversely effect actual use of the turn rate indicator.

The invention of this application is further explained in detail with reference to the attached drawings. In the explanation a turn coordinator is used as the turn rate indicator, but it should be realized that the invention may be used in any other types of indicator.

Figure 1:
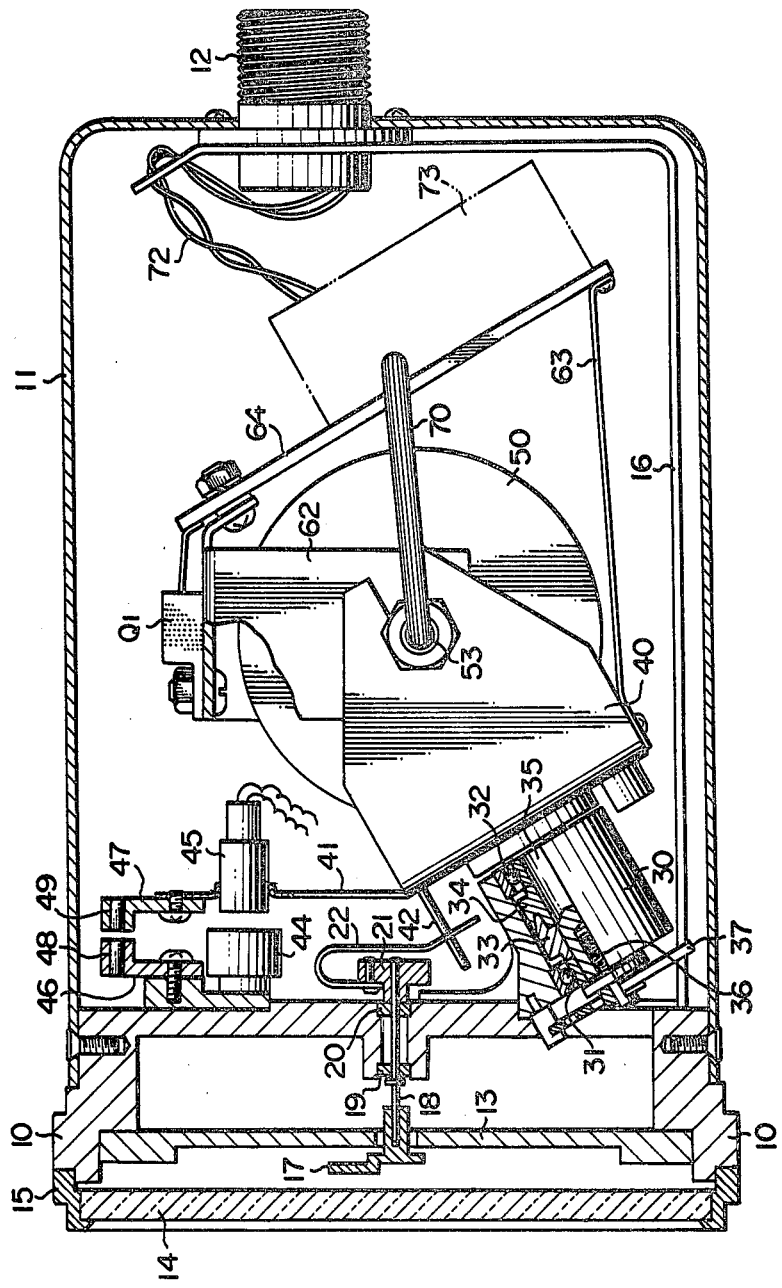
FIG. 1 shows a side view of an embodiment of the turn rate indicator of this invention, a part thereof being broken away to show its inner construction.

As shown in FIG. 1, to a body 10 which is made of an aluminium alloy casting, etc. is integrally provided a gimbal bearing sleeve 30. To a gimbal 40 is fixed a gimbal shaft 35 which is rotatably supported in the gimbal bearing sleeve 30 by roller bearings 31 and 32. To the gimbal shaft 35 are further fixed damping rings 33 and 34 and an adequate damping liquid is filled between the outer peripheries of the rings 33 and 34 and an inner wall of the gimbal bearing sleeve 30. In this embodiment the damping rate is made more than 1, over damping, with respect to the rotation of the gimbal assembly around its axis.

Between the head of a screw 36 provided integrally at the lower end of the gimbal shaft 35, and the gimbal bearing sleeve 30 is provided a hair spring 37. The gimbal shaft 35 is in a normal plane which is parallel to the aircraft axis, and is maintained tilted at 30° with respect to the aircraft axis. By slits provided at both top ends of the gimbal 40 a stator axle 53 of the Hall motor is supported. The stator axle 53, which is also a spin axis of the gyroscope, is supported in parallel with the pitch axis of the aircraft.

Figure 2:
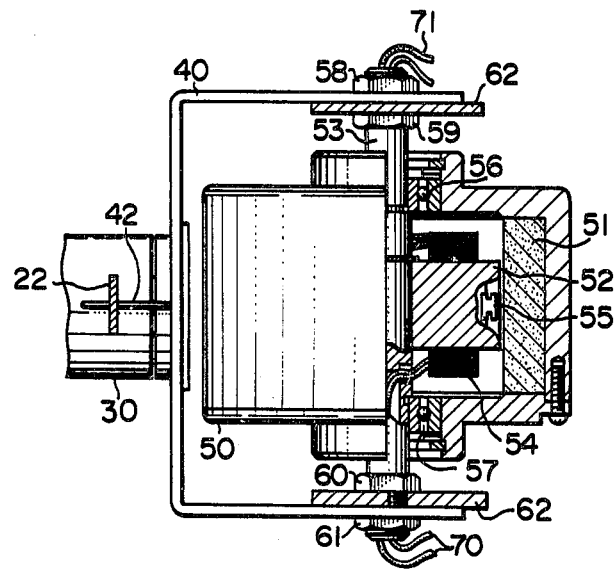
FIG. 2 shows relation between a gimbal and a Hall motor which constitutes a gyro rotor.

FIG. 2 is a view of the gimbal and the gyro rotor seen from the direction at a right angle to the gimbal shaft 35. The gimbal 40, the stator axle 53 and a control circuit support frame 62 which acts also as a radiator plate as will be explained later are fixed to one another by nuts 58, 59, 60 and 61.

A Hall motor rotor 50 which constitutes a gyro rotor is rotatably supported to the stator axle 53 by bearings 56 and 57.

The numeral 52 denotes one of the stator cores. The stator of this Hall motor has four poles, each pole having a core wound with a coil 54. Among the four cores, at the top ends of two of the cores which are 90° apart from each other are provided Hall elements 55. The stator coils and the Hall elements are connected to a revolution and speed control circuit 73 by connecting lines 70 and 71 through holes provided at both sides of the stator axle 53 opening to the outside. An explanation will be given later as to the revolution and speed control circuit 73.

A printed circuit board 64 constituting the speed control circuit 73 is supported by the speed control circuit support frame 62 and also by a support frame whose other end is fixed to the gimbal 40. Power transistors $Q_1$, which switch a supply of current to the coil 54 wound around the core 52 of the motor stator, are connected thermally to the frame 62 and electrodes of the transistors are soldered to the printed circuit board 64. An additional three transistors, not shown, are similarly provided.

Power source connecting lines 72 which connect a D.C. power source to a control circuit is connected with slack between the control circuit 73 and a connector 12 which is fixed to both a case 11 and a main frame 16, so as not to limit the rotation of the gimbal 40.

Connected to the power source, a magnetized magnet ring mounted at an inner side of the Hall motor rotor 50 affects flux to the Hall elements, the four transistors connected to the coils are successively operated and a rotative magnetic field is formed so as to rotate the rotor at high speed.

The gimbal 40 is provided with a transmission pin 42 and an arm 41. To the arm 41 are fixed a lamp 45 which forms a light source and also a non-magnetic member 47 supporting a permanent magnet piece 49. The piece 49 faces another permanent magnet piece 48 supported by a non-magnetic member 46. The light source lamp 45 faces a photoelectric member 44 which has an electric output corresponding to the rotation of the light source lamp 45. With this construction, an electric output may also be taken out, which will be explained later.

Figure 3:
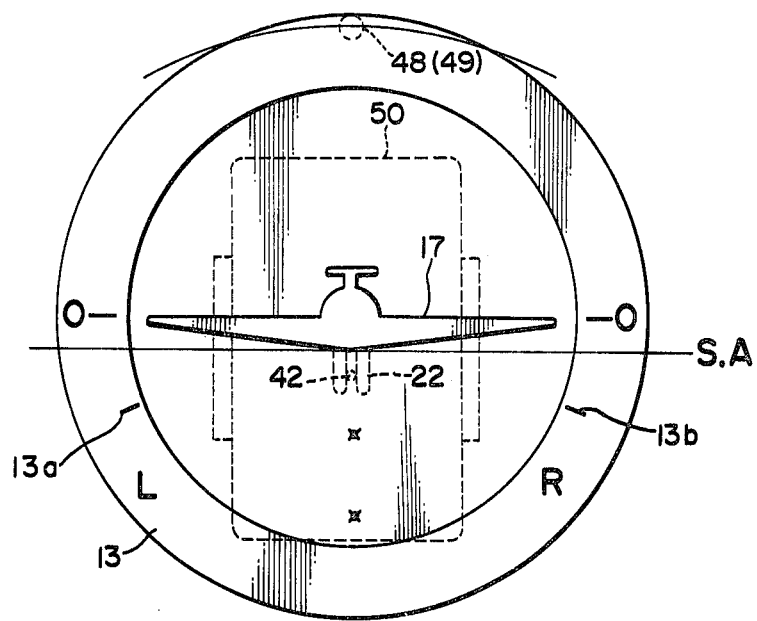
FIGS. 3 and 4 are views explaining the relation of a dial plate and a pointer.
Figure 4:
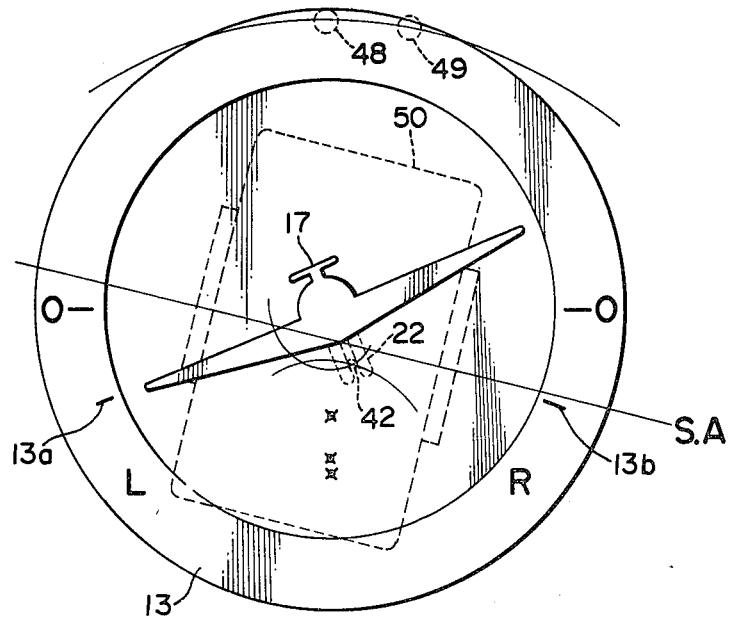

The relation of the pointer 17, the gyro rotor 50 and the permanent magnets is further explained in detail, using FIGS. 3 and 4. In these figures, the turn rate indicator of this invention is shown from the front of a panel 13. The point 17 has the shape of an aircraft, is fixed to a pointer and shaft 18 and is rotatably supported by bearings 19 and 20 in an opening (as shown in FIG. 1) in the center of the body 10. To the other end of the shaft 18 is fixed a pointer wheel 21 to which is further fixed a fork spring 22. The fork spring 22 is connected to the transmission pin 42 which is fixed to the gimbal 40.

As shown in FIG. 3, when the spin axis SA of the rotor 50 is kept parallel to the aircraft axis, the wings of the pointer 17 indicate the zero points. At this time, the central axes of the permanent magnets 48 and 49 mentioned before are aligned with each other.

FIG. 4 shows the position of the pointer 17 when the aircraft is turning to the left. The marks L and R shown in the panel plate 13 denote respective left turn and right turn of the aircraft. When the pointer indicates an index 13a, it means a turn rate of 180°/minute in the left direction. In the usual turn of the aircraft, an ordinary turn position of the index 13a or an index 13b is chosen. Specifically, a larger turn rate than the ordinary rate or a half or less of the ordinary rate, such as 90°/minute is not usually chosen.

Figure 5:
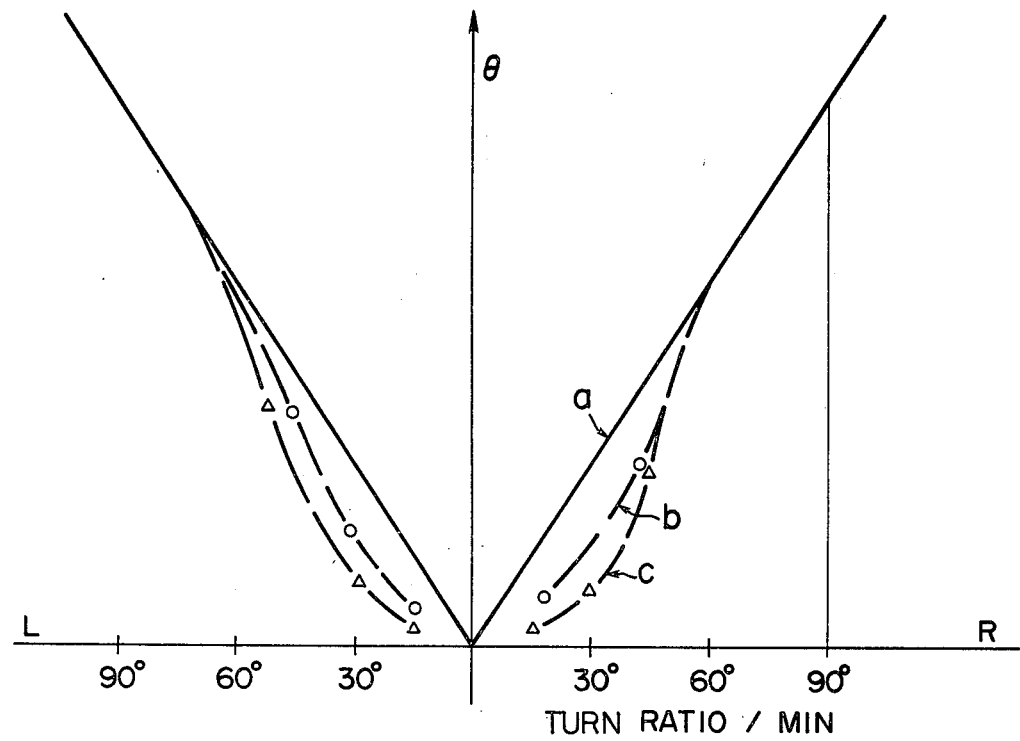
FIG. 5 is a graph showing the turn rate and angle of deviation.

FIG. 5 is a graph explaining the operation of the turn rate indicator of the above construction. In the graph, the axis of abscissa corresponds to the turn rate, and the axis of ordinate corresponds to the rotation angle of the pointer. In this figure, the straight line a shows the characteristics of an ordinary device whose turn rate and angle of deviation are proportional to each other. The curves b and c in the figure show values actually measured when the distance between the top ends of the permanent magnet pieces 49 and 48 was 2mm and 1mm, respectively. Other conditions were the same as those shown hereunder.

(1) Size of permanent magnet piece 49 : 20 × 3mm
(2) Size of permanent magnet piece 48 : 20 × 3mm
(3) Distance from gimbal shaft to top end of permanent magnet 49 : 40mm
(4) Flux strength generated by permanent magnets 49 and 48 : 380 gauss
(5) Polarities of the permanent magnet faces 49 and 48 are opposite and when both faces are close to each other, the magnets are attracted to each other.
(6) Supporting members of the permanent magnets 48 and 49 have flexibility, which support movement of the magnets axially.

As is apparent from FIG. 5, by using the permanent magnet pieces, sensitivity falls within 60°/minute of the turn rate because of the attracting force between the permanent magnets, which is significant in the curve c for the smaller gap.

For rates in excess of 60°/minute the influence of the attracting force is not seen.

Return of the pointer after termination of turning under the above condition has been actually measured. When the turning was stopped at 180°/minute, return to 36°/minute took almost same time in a, b and c, but after the point of 36°/minute to the zero point the returning time was eight seconds in c for a 1mm gap and 13 seconds in b for a 2mm gap, and in either case the pointer stopped at the zero point with certainty. Returning time to the point which may be regarded as zero was 18–25 seconds in the case of a.

An experiment was also conducted with a narrower gap between the faced ends of the permanent magnets. When the gap was less than 0.5mm, stability of the measured value is not to be expected. It has been concluded therefore that the distance of the gap should be chosen within 1.5–2.2mm. The axial distance between the magnet pieces 48 and 49 is variable permitting the gap therebetween to be changed.

With the gap within the above range, when the pointer is at the zero point or in the vicinity thereof, the attracting forces work with each other. Although some braking force is seen in the lateral angular displacement direction of the gimbal 40 at the beginning of the turning of the aircraft, this braking force may be ignored because at that time, a very large rotation torque is generated in the gimbal 40. An indication error in the vicinity of the zero point may be ignored in use as an aircraft instrument as already explained before.

The turn rate indicator of the aircraft according to this invention is as above constructed, and when the turn is completed, the pointer returns smoothly to the zero point. Therefore, the pilot of the aircraft need not feel uneasy because of a late and incomplete return of the pointer.

In the conventional turn rate indicators, the return of the pointer is affected even by a slight frictional force, and the pointer is apt to stop in the vicinity of the zero point. The indicator of this invention overcomes this problem completely.

Modifications and variations may be made to the embodiment as above explained. For example, an iron piece may be substituted for either of the magnets 48 and 49 and the same result obtained.

Further, the magnet 49 may not necessarily be rotatable integrally with the gimbal 40, but may only be one which can move according to the movement of the gimbal and which can affect the movement of the gimbal.

What I claim is:

1. An aircraft turn rate indicator having improved zero seeking characteristics comprising
   a gimbal secured to a body and supporting a gyro rotor, said gimbal having freedom of rotation around one axis and being given a returning torque to a zero point,
   indication means providing an indication in proportion to the angular displacement of said gimbal, a damping device for damping in the angular direction of said gimbal, a first magnetic substance piece which rotates integrally with the gimbal and is supported apart from the shaft of said gimbal, and a second magnetic substance piece fixed to said body, said second magnetic substance piece facing and being spaced from said first magnetic substance piece by an air gap when the gimbal is at its zero point and being attracted to said first piece, one of the magnetic substance pieces being a permanent magnet piece.

2. An aircraft turn rate indicator having improved zero seeking characteristics according to claim 1, wherein the magnetic substance pieces are a pair of permanent magnet pieces facing each other and of opposite polarities from each other.

3. An aircraft turn rate indicator having improved zero seeking characteristics according to claim 1, wherein the axial distance between the permanent magnet piece and the other magnetic piece is variable and the size of the gap therebetween is changeable.

4. An aircraft turn rate indicator having improved zero seeking characteristics according to claim 1, wherein the permanent magnet piece and the other magnetic piece affect the gimbal in its rotational direction only in the vicinity of the zero point.

5. An aircraft turn rate indicator having improved zero seeking characteristics according to claim 1, wherein said damping device has a critical damping rate.

6. An aircraft turn rate indicator having improved zero seeking characteristics according to claim 1, wherein said damping device has an over damped damping rate.

7. An aircraft turn rate indicator having improved zero seeking characteristics according to claim 1, wherein said air gap has a length of 1.5 to 2.2 mm.

* * * * *